Patented Mar. 20, 1934

1,951,571

UNITED STATES PATENT OFFICE 1,951,571

PROCESS OF PREPARING DYEINGS AND PRINTINGS

Richard Fischer and Hermann Freund, Frankfort-on-the-Main, Germany, assignors to General Aniline Works, Inc., New York, N. Y., a corporation of Delaware No Drawing. Application April 27, 1932, Serial No. 607,881. In Germany May 8, 1931

7 Claims. (Cl. 8—5)

The present invention relates to a new method of developing insoluble azo-dyestuffs on the fiber and to the application of this method in the production of printings by means of azo dye preparations alone or together with printings by means of ester salts of leuco vat dyestuffs and in the production of colored resists under dyeings from aniline black preparations or from ester salts of leuco vat dyestuffs.

Mixtures of azo coupling components for producing on the fiber azo dyestuffs free from sulfonic- and carboxylic acid groups, the so-called "substantive azo components", with stabilized diazo compounds of the group consisting of water-soluble diazo-amino compounds from aromatic diazo compounds and of alkali metal salts of aromatic nitrosamines have found extensive application in dyeing and printing for the production of insoluble azo dyestuffs on the fiber according to the so-called one-bath method.

Hitherto the development of the azo dyestuffs from the mixtures of the said components was carried out by passing the textile material, impregnated with the solution of the mixtures or printed with a printing paste containing the said preparations, into a hot bath containing feeble acids, preferably organic acids, if necessary after a short steaming operation, or by steaming the material treated with the mixtures of the above components in the presence of a volatile organic acid.

These developing methods are not quite satisfactory. The first operation has the disadvantage that the components printed on the fiber are partly removed from the material when the fiber is treated in the hot acid bath, before they have formed the insoluble azo dyestuff. Consequently the preparations are only insufficiently utilized; on the other hand it is possible that the printings are mutually rendered turbid when different printing pastes of different colors are applied or that the white parts of the printed material are also colored.

The developing method by using steam mixed with organic volatile acids is troublesome inasmuch as the steaming apparatus which are mostly built of iron are strongly corroded by the hot acid steam. Furthermore it is not advantageous to use acid steam in a steaming apparatus which is simultaneously used for steaming printings of other dyestuffs, for instance, vat dyestuffs containing sodium sulfoxylate in the printing paste, since the presence of the acid prevents the fixing of such dyestuff preparations.

We have now found that the development of the above mentioned mixtures of dyestuff components to form the insoluble azo dyestuffs on the fiber may advantageously be performed by first padding or printing the material with a solution or printing paste containing the above defined azo dyestuff preparations, if necessary drying the material, thereafter padding it with a solution containing an aqueous solution of one or more dilute organic acids, such as acetic acid, formic acid, glycolic acid, oxalic acid, etc., or phosphoric acid, or easily dissociating metal salts of inorganic acids, such as sulfates or chlorides of magnesium, zinc, aluminium, and the like, or salts which are capable of splitting of acid, such as ammonium salts of organic acids or mixtures of these substances, and thereupon subjecting the thus treated material to a drying operation by passing it over heated drying cylinders or through a heated chamber or drawing it through a suitable container filled with steam. This heating operation causes a complete development of the azo dyestuffs, so that no bleeding or running of the colors occurs when the material is finally washed and soaped in a boiling soap bath.

The term "substantive azo component" used in the specification and claims covers all kinds of coupling components for producing azo dyestuffs, free from sulfonic and carboxylic acid groups, on the fiber. Coupling components of this class are, for instance, naphthols, arylamides of 2.3-hydroxynaphthoic acid, compounds containing a reactive methylene group capable of coupling with diazo compounds, such as pyrazolone derivatives or arylamides of beta-ketone-carboxylic acids, among which arylamides of aceto-acetic acid, benzoylacetic acid, terephthaloyldiacetic acid and other acylacetic acids, or diacyl-acetyl-arylamines, such as diacetoacetylbenzidine or -tolidine and other products of condensation from acylacetic esters with di- and mono-amino bases, which are described for example in the British Patents Nos. 211,772 and 211,814, may be mentioned.

Other substantive azo components are the arylamides of 2.3-hydroxyanthracene carboxylic acid, of ortho-hydroxy-carbazole carboxylic acids, of ortho - hydroxy - benzocarbazole - carboxylic acids, etc.

These coupling components are mostly present in the preparations used for the herein described process in the form of their alkali metal salts.

The stabilized diazo compounds forming the other components in the preparations are water-soluble diazo-amino compounds or nitrosamine alkali metal salts.

Water-soluble diazo-amino compounds are obtainable, for instance, according to the British Patents Nos. 320,324 and 324,041 from aromatic diazo compounds free from sulfonic acid or carboxylic acid groups, on the one side, and primary aromatic amines containing one or more sulfonic acid groups, two or more carboxylic acid groups or both sulfonic and carboxylic acid groups, or secondary amines of the general formula:

wherein $R_1$ and $R_2$ represent alkyl, aryl, aralkyl or hydroaryl radicals containing at least one substituent which is capable of rendering the components soluble in water, on the other side. These primary or secondary amines containing water-soluble groups are called the "stabilizers".

The nitrosamine alkali metal salts which are also stabilized diazo compounds may be represented by the general formula:

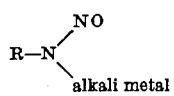

wherein R means an aromatic radical, and are obtainable by causing an alkali to act upon a diazo solution.

The mixtures of the substantive azo components and the stabilized diazo compounds are commercial products and are put on the market as dry solid products or in the form of pastes.

Mixtures comprising a water soluble diazo-amino compound and a coupling component for producing azo-dyestuffs free from sulfonic or carboxylic acid groups are disclosed, for instance, in the British Patent No. 334,529. Compositions containing a coupling component and a nitrosamine alkali metal salt as the stabilized diazo compound are mentioned in a number of patents, for example in U. S. Patents Nos. 1,193,566; 1,127,027; 1,608,284; British Patents Nos. 340,534; 328,383.

Our new developing method is generally applicable to all these dyeing preparations as above defined.

The new method of transforming the preparations into insoluble azo dyestuffs on the fiber is, however, not only applicable to the said preparations alone but may advantageously employed for the production of colored resists under aniline black, for the production of colored resists under dyeings produced by means of ester salts of leuco vat dyestuffs, or for preparing prints in different patterns consisting of azo dyestuff formed from the said mixtures of azo components besides prints produced by means of ester salts of leuco vat dyestuffs. The new developing method may further be used in the production of colored resists under aniline black, the colored resist patterns consisting of azo colors developed from the azo dye preparations on the one part and of vat colors developed from ester salts of leuco vat dyestuffs on the other part, the different preparations having been applied to the material in separate patterns; or the colored resists consist of colors formed from mixtures of the azo dyestuff preparations with ester salts of leuco vat dyestuffs.

In all cases herein referred to, the same very principle of developing the azo dyestuff preparations is applied, namely treating (padding or impregnating) the material which has previously been printed with the said mixtures of azo coupling components and stabilized diazo compounds, alone or in combination with aniline black preparations and/or ester salts of leuco vat dyestuffs, with an aqueous solution of one or more organic acids, or phosphoric acid, or an easily dissociating metal salt of an inorganic acid, or a salt capable of splitting off an acid, and thereupon subjecting the thus treated material to a drying operation by conducting it over heated drying cylinders or through a heated chamber.

The technical advantage attained by the new developing method resides in the fact that this method can so easily be combined with the development of aniline black preparations and ester salts of leuco vat dyestuffs.

In order to illustrate these combined dyeing, printing and resist coloring methods which form a part of the present invention, the following more detailed descriptions and examples of the principal methods are given. Our invention is, however, not limited to these examples.

(A) Printing with the mixtures of the substantive azo components and the stabilized diazo compounds:

(1) A tissue is printed with the following printing color:

80 grams of a mixture of the diazo amino compound obtainable from 4-chloro-2-amino-1-methylbenzene and 4-sulfo-2-aminobenzoic acid with diaceto-acetyl-ortho-tolidide (cf. No. 3 of the table of British Patent No. 334,529)
370 grams of water
20 grams of caustic soda solution of 38° Bé.
30 grams of the sodium salt of sulfonated castor oil
500 grams of neutral starch tragacanth thickening 1000 grams The material is then dried and padded on the reverse side on a two-roller-foulard with one of the following solutions:

(a) 25 grams of acetic acid of 50% strength and 25 grams of formic acid of 80% strength per liter of water or
(b) 30 grams of glycolic acid per liter of water or
(c) 25 grams of acetic acid of 50% strength and 25 grams of glycolic acid per liter or
(d) 25 grams of oxalic acid per liter or
(e) 25 grams of acetic acid of 50% strength and 10 grams of oxalic acid per liter or
(f) 50 grams of zinc sulfate per liter or
(g) 50 grams of aluminium sulfate per liter or
(h) 50 grams of magnesium sulfate per liter or
(i) 40 grams of phosphoric acid per liter.

Thereupon the material thus treated is directly dried on a cylinder drying machine, rinsed and soaped at the boil. There are obtained very vivid, fast yellow prints.

(2)

45 grams of the mixture of the diazoamino compound obtainable from 1-amino-4-benzoylamino-2.5-dimethoxybenzene and n-butylamino acetic acid with the sodium salt of 2.3-hydroxynaphthoylaminobenzene (cf. No. 46 of the table of British Patent No. 334,529)
215 grams of water
30 grams of caustic soda solution of 38° Bé.
30 grams of alcohol
500 grams of neutral starch tragacanth thickening
30 grams of ethylenethiodiglycol
50 grams of urea
100 grams of zinc oxide mixed with water in the ratio of 1: 1
———
1000 grams After printing and drying, the material is treated as indicated in Example 1. There are obtained full, very fast blue prints.

(3) The following printing color is printed on tissue:

80 grams of the dyestuff preparation obtainable according to Example 1 of German Patent No. 524,266, consisting of the sodium salt of nitrosamine of 5-chloro 2-methoxy-1-aminobenzene, sodium hydroxide, sodium acetate and diacetoacetyl-ortho-tolidide or 80 grams of the dyestuffs preparation obtainable according to Example 3 of German Patent No. 540,607, consisting of the sodium salt of the nitrosamine of 5-chloro-2-methoxy-1-aminobenzene, sodium hydroxide, sodium acetate and 2'.3'-hydroxynaphthoyl- 2 -methoxy- 1 -aminobenzene
370 grams of water
20 grams of caustic soda solution of 38° Bé.
30 grams of the sodium salt of the sulfonation product of castor oil
500 grams of neutral starch tragacanth thickening
———
1000 grams The printed material is dried and padded on the reverse side on a two-roller-foulard with one of the following solutions containing per 1 liter of water:
(a) 25 grams of acetic acid of 50% and 25 grams of formic acid of 80% strength or
(b) 30 grams of glycolic acid or
(c) 25 grams of acetic acid of 50% and 25 grams of glycolic acid or
(d) 25 grams of oxalic acid or
(e) 25 grams of acetic acid of 50% and 10 grams of oxalic acid or
(f) 50 grams of zinc sulfate or
(g) 50 grams of aluminium sulfate or
(h) 50 grams of magnesium sulfate or
(i) 40 grams of phosphoric acid.

Thereupon the material is directly dried on a cylinder drying machine, rinsed and soaped at the boil.

(B) Production of color resists under oxidation colors, particularly aniline black, by means of the mixtures of substantive azo components and the stabilized diazo compounds:

The new developing method of the azo dyestuff preparations is of particular advantage in the production of color resists (resist printing) under aniline black. Hitherto, the material printed with the resist printing pastes had to be steamed before passing it into the aniline black padding liquor.

According to our new process the developing of the azo dyestuff preparations, contained in the resist pastes can be carried out after the material is padded with the aniline black preparation, without any previous steaming. The developing agents, i. e. the organic acids, or phosphoric acid, or easily dissociating salts, or salts which are capable of splitting off acid, are simply added to the aniline black padding liquor. The material is first printed with the resist printing paste containing the azo dyestuff preparations, the usual thickenings and resist agents, such as alkali metal hydroxides or -carbonates, or alkali metal salts of organic acids, or oxides, hydroxides, carbonates or organic acid salts of zinc, calcium, magnesium, and the like, thereupon padded with the aniline black padding liquor to which the above defined agents have been added and subsequently subjected to a drying operation by conducting it over heated cylinders or through a heated chamber. Hereby the azo dyestuffs are developed on the printed parts of the material. Thereafter, the material is steamed for a short time in order to develop the aniline black. In order to complete the oxidation of the aniline black, the material is subjected to an aftertreatment with a chromate. Finally it is rinsed and soaped. The following examples show how the new developing method may be applied to the production of color resists under aniline black:

(4)

80 grams of the mixture of the diazoamino compound from 4-chloro-2-amino-1-methylbenzene and 4-sulfo-2-aminobenzoic acid with the sodium salt of 2'.3'-hydroxynaphthoyl-2-ethoxy-1-aminobenzene (cf. No. 12 of the table of British Patent No. 334,529)
160 grams of water
30 grams of caustic soda solution 38° Bé.
30 grams of alcohol
500 grams of neutral starch-tragacanth-thickening
200 grams of zinc oxide mixed with water in the ratio of 1:1
———
1 kilo After printing and drying, the material is padded on a two-roller-foulard between the two rollers with the following aniline black padding liquor:

Solution A
80 grams of aniline salt
5 grams of aniline oil
50 grams of tragacanth mucilage 60:1000
260 cc. of water Solution B
54 grams of potassium ferrocyanide
250 cc. of water Solution C
35 grams of sodium chlorate
250 cc. of water
40 cc. of acetic acid of 50% strength
10 cc. of formic acid of 85% strength The Solutions A, B and C are mixed before use and made up to 1 liter.

After being padded, the prints are at once dried on a cylinder drying machine, steamed for 3 minutes in a rapid ager, treated in an acid chromatebath, rinsed and soaped. There are obtained scarlet red effects on a black ground.

(5) White cotton tissue or artificial silk tissue is printed with:

80 grams of the dyestuff preparation obtainable according to Example 2 of German Patent No. 540,607 and consisting of a mixture of the sodium salt of the nitrosamine from 2.5-dichloraniline, free sodium hydroxide, sodium acetate and 2'.3'-hydroxynaphthoyl-2-methoxy-1-aminobenzene
    160 grams of water
    30 grams of caustic soda solution of 38° Bé.
    30 grams of alcohol
    500 grams of neutral starch tragacanth thickening
    200 grams of zinc oxide mixed with water in the ratio of 1:1

1 kilo

After the material has been printed and dried, it is padded on a two-roller-foulard between the two rollers with the following aniline black padding solution:

Solution A
    80 grams of aniline salt
    5 grams of aniline oil
    50 grams of tragacanth mucilage 60:1000
    260 cc. of water Solution B
    54 grams of potassium ferrocyanide
    250 cc. of water Solution C
    35 grams of sodium chlorate
    250 cc. of water
    40 cc. of acetic acid of 50% strength
    10 cc. of formic acid of 85% strength The Solutions A, B and C are mixed before use and made up to 1 liter.

After having been padded, the prints are at once dried on a cylinder drying machine, steamed for 3 minutes in a rapid ager, after-treated with chromium compounds, rinsed and soaped. There are obtained scarlet red effects on an aniline-black ground.

(C) Application of the new developing method to the production of color resists under or on dyeings prepared by means of ester salts of leuco vat dyestuffs, as well as for the production of printings in different patterns by means of separate printing pastes the one of which contains the azo dyestuff preparations and the other an ester salt of a leuco vat dyestuff.

I. A resist printing paste containing the azo dyestuff preparations comprising a substantive azo coupling component and the stabilized diazo compound, the usual thickening agents and resist agents, such as oxides, hydroxides or carbonates of zinc or alkaline earth metals, such as magnesium, calcium, and the like, and a further addition of a mild reducing agent, such as sodium thiosulfate, is printed on the material which has been padded with a padding liquor containing an ester salt of a leuco vat dyestuff besides an oxidizing agent, such as sodium nitrite or a neutral chromate. The thus impregnated and printed material is dried, thereupon padded in a bath containing an aqueous solution of the above-defined "developing agents", namely dilute organic acids, or phosphoric acid, or easily dissociating salts, such as sulfates, chlorides etc. of aluminium, zinc or magnesium and the like, or salts which are capable of splitting off acid, or mixtures of such agents, and immediately thereafter subjected to a drying operation by conducting it over heated cylinders or through a heated chamber. By these operations the azo dye preparations are developed to the insoluble azo dyestuffs and simultaneously the ester salts of the leuco vat dyestuffs are transformed into the corresponding vat dyestuffs. The following examples illustrate this resist dyeing method:

(6) The material is padded with the following solution and then dried:
    30 grams of the esterified leuco compound of the formula

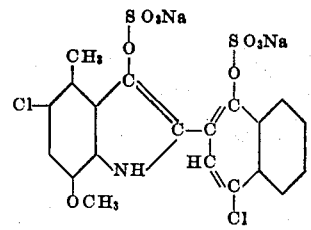

30 grams of ethylenethiodiglycol
    865 grams of water
    15 grams of sodium nitrite
    10 grams of ammonia of 25% strength
    50 grams of tragacanth mucilage 60:1000, made up to 1 liter.

Printing color:
    80 grams of the dyestuff preparation used according to Example 1
    270 grams of water,
    20 grams of caustic soda solution of 38° Bé.
    30 grams of denatured alcohol
    500 grams of neutral starch tragacanth thickening
    50 grams of zinc white 1:1
    50 grams of sodiumthiosulfate 1 kilo After printing and drying, the material is padded with a solution containing per 1 liter of water 10 grams of oxalic acid
    15 grams of formic acid of 85% strength and
    25 grams of Glauber's salt, directly thereafter dried on a cylinder drying machine; thereupon it is rinsed and soaped for 10 minutes at boiling temperature.

There are obtained fast pure yellow prints from an azo dyestuff on a blue vat dye ground.

(7) The material is padded with the following solution and then dried:

30 grams of the ester salt of the leuco vat dyestuff used according to Example 6
    30 grams of ethylenethiodiglycol
    865 grams of water
    15 grams of sodium nitrite
    10 grams of ammonia of 25% strength
    50 grams of tragacanth mucilage 60:1000, made up to 1 liter Printing color:

80 grams of the dyestuff preparation obtainable according to Example 1 of German Patent No. 524,266 and consisting of the sodium salt of the nitrosoamine from 5-chloro-2-methoxy-1-aminobenzene, sodium hydroxide, sodium acetate and diacetoacetyl-2-methoxy-1-aminobenzene
270 grams of water
20 grams of caustic soda solution 38° Bé.
30 grams of denatured alcohol
500 grams of neutral starch tragacanth thickening
50 grams of zinc white 1:1
50 grams of sodium thiosulfate.

1 kilo

After printing and drying, the material is padded with a solution containing per 1 liter of water 10 grams of oxalic acid
15 grams of formic acid of 85% strength
25 grams of Glauber's salt, directly thereafter dried on a cylinder drying machine, rinsed and soaped for 10 minutes at boiling temperature.

The ester compound of the leuco vat dyestuff is reserved at the printed parts of the fabric by the zinc oxide and the thiosulfate. There are obtained fast, very pure, yellow prints on a blue vat dye ground.

II. If ester salts of leuco vat dyestuffs are used which per se cannot be completely developed by means of sodium nitrite and an organic acid, the following modified method may be applied with good results:

In the padding liquor containing the ester salt of a leuco vat dyestuff the sodium nitrite is replaced by an alkali metal chlorate together with an agent which is capable of accelerating the oxidation, such as ammonium vanadate. The process is otherwise carried out in the manner disclosed above under I with the exception that it is essential that aluminium sulfate is present in the padding solution which is applied before the material is subjected to the drying operation. Thus, the azo dye preparations are developed to the insoluble azo dyestuffs and simultaneously the ester salts of the leuco vat dyestuffs are completely transformed into the vat dyestuffs. The following examples show how this modified method may be carried out:

(8) The material is padded with the following solution:

20 grams of the sodium salt of the sulfuric acid ester of the leuco vat dyestuff No. 1315 of Schultz Farbstofftabellen, 7th edition,
30 grams of ethylenethiodiglycol,
850 grams of water,
50 grams of tragacanth mucilage 60:1000
25 grams of sodium chlorate,
25 grams of ammonium vanadate 1:100, made up to 1 liter After drying, the material is printed with the following printing color:

80 grams of the dyestuff preparation consisting of a mixture of the diazoamino compound of 4-chloro-2-amino-1-methoxybenzene and methylamino acetic acid with the sodium salt of 2'3'-hydroxynaphthoyl-2-methoxy-1-aminobenzene (cf. No. 20 of the table of British Patent No. 334,529)
100 grams of water,
30 grams of alcohol,
30 grams of caustic soda solution of 38° Bé.
450 grams of neutral starch tragacanth thickening,
100 grams of zinc white 1:1,
50 grams of sodium thiosulfate,
160 grams of water, 1 kilo After printing and drying, the material is padded with a solution containing per 1 liter of water 30 grams of acetic acid of 50% strength
30 grams of formic acid
60 grams of aluminium sulfate The material is dried on heated cylinders or in heated chambers. There are obtained fast, vivid, full red prints on a medium blue, vivid ground.

(9) The material is padded with the following solution:

20 grams of the sodium salt of the sulfuric acid ester of the leuco vat dyestuff No. 1315 of Schultz Farbstofftabellen, 7th ed.
30 grams of ethylenethiodiglycol
850 grams of water
50 grams of tragacanth mucilage 60:1000
25 grams of sodium chlorate
25 grams of vanadate of ammonium 1:100, made up to 1 liter After the material has been dried, it is printed with the following printing color:

80 grams of the mixture of the sodium salt of the nitrosoamine from 5-chloro-2-methyl-1-aminobenzene with the sodium salt of 2'.3'-hydroxynaphthoyl-2-methyl-1-aminobenzene and anhydrous sodium acetate, obtainable according to German Patent No. 540,607,
100 grams of water
30 grams of alcohol
30 grams of caustic soda solution of 38° Bé.
450 grams of neutral starch tragacanth thickening
100 grams of zinc white 1:1
50 grams of sodium thiosulfate
160 grams of water 1 kilo After the material has been printed and dried, it is developed as indicated in Example 8. There are obtained fast, vivid, full red prints on a medium blue vivid ground.

III. Another method of preparing color resists under impregnations of ester salts of leuco vat dyestuffs is the combinations of the new developing method of the azo dye preparations with the so-called steaming developing process of the ester salts of leuco vat dyestuffs:

The material is first printed with a resist printing paste containing a mixture of a substantive azo component with a stabilized diazo compound of the kind disclosed, a thickener and additions of an oxide, hydroxide or carbonate of an alkaline earth metal together with a reducing agent of mild action (sodium thiosulfate) as resists. The printed material is dried and thereupon padded with a solution containing an ester salt of a leuco vat dyestuff, an oxidizing agent, such as sodium chlorate, an agent which is capable of splitting off acid, such as ammonium oxalate, ammonium thiocyanate, diethyltartrate, etc., an agent for accelerating the oxidation, such as ammonium vanadate, and an ammonium salt of a feeble organic acid, such as ammonium acetate. The material, thus treated, is then subjected to a drying operation by drawing it over heated cylinders or through heated chambers, whereby the azo dye preparations are transformed into the insoluble azo dyestuffs. Thereafter, the cloth is steamed in the Mather-Platt apparatus in order to develop the ester salts to the corresponding vat dyestuffs. Colored effects consisting of azo dyestuffs are thus formed on a vat dye ground. The following examples illustrate this method:

(10) The following printing color is printed on the material:

80 grams of the mixture of azo dyestuff components as used in Example 4
30 grams of caustic soda solution of 38° Bé.
30 grams of denatured alcohol
260 grams of water
500 grams of neutral starch tragacanth thickening
50 grams of zinc white 1:1
50 grams of sodium thiosulfate 1 kilo After printing and drying, the material is padded with the following solution:

30 grams of the ester salt of the leuco vat dyestuff used according to Example 6
30 grams of ethylenethiodiglycol
780 grams of water
50 grams of tragacanth mucilage
25 grams of ammonia of 25% strength
30 grams of acetic acid of 50% strength
20 grams of oxalate of ammonium
15 grams of sodium chlorate
20 grams of vanadate of ammonium 1:100, made up to 1 liter After the material has been padded, it is immediately dried on a cylinder drying machine, steamed for 5 minutes in a rapid ager, rinsed and soaped at the boil for 10 minutes. There are obtained fast scarlet red prints on a vat dye ground.

(11) The following printing color is printed on the material:

80 grams of the dyestuff preparation obtainable according to Example 3 of German Patent No. 540,607 and consisting of the sodium salt of the nitrosamine of 5-chloro-2-methoxy-1-aminobenzene, sodiumhydroxide, sodium acetate and 2'3'-hydroxynaphthoyl-2-methoxy-1-aminobenzene,
30 grams of caustic soda solution of 38° Bé.
30 grams of denatured alcohol
260 grams of water
500 grams of neutral starch tragacanth thickening
50 grams of zinc white 1:1
50 grams of sodium thiosulfate 1 kilo After printing and drying, the material is padded with the following solution:

30 grams of the ester salt of the leuco vat dyestuff used according to Example 6
30 grams of ethylenethiodiglycol
780 grams of water
50 grams of tragacanth mucilage
25 grams of ammonia of 25% strength
20 grams of the oxalate of ammonium
30 grams of acetic acid of 50% strength
15 grams of sodium chlorate
20 grams of vanadate of ammonium 1:100, made up to 1 liter After the material has been padded, it is directly dried on a cylinder drying machine, steamed for 5 minutes in a rapid ager, rinsed and soaped at the boil for 10 minutes. There are obtained fast red prints on the vat dye ground.

IV. Production of printings in different patterns by means of separate printing pastes, the one of which contains the azo dye preparation, comprising a substantive azo component and a stabilized diazo compound, and the other an ester salt of a leuco vat dyestuff. Any of the different developing methods for transforming the ester salts of the leuco vat dyestuffs into the corresponding vat dyestuffs (compare above under I, II and III) may analogously be applied to the printing process by means of the ester salts and combined with the new developing process for the azo dye preparations. The following specific examples disclose the preparation of suitable printing pastes and the application of our new developing operation for preparing printings by means of the azo dye preparations besides printings by means of ester salts of leuco vat dyestuffs:

(12) The following two printing colors are printed on the material in different designs:

(a) 80 grams of a mixture of the diazoamino compound from 4-chloro-2-amino-1-methylbenzene and 4-sulfo-2-aminobenzoic acid with the sodium salt of 2'.3'-hydroxynaphthoyl-2-ethoxy-1-aminobenzene (cf. No. 12 of the table of British Patent No. 334,529)
360 grams of water
30 grams of caustic soda solution of 38° Bé.
30 grams of sodium salt of sulfonated castor oil
500 grams of neutral starch tragacanth thickening 1 kilo (b) 80 grams of the sulfuric acid ester of dimethoxydibenzanthrone
30 grams of ethylenethiodiglycol
60 grams of a mixture of ethyleneglycol, dihydroxyethyleneglycol and monomethylether
270 grams of water
500 grams of neutral starch tragacanth thickening
40 grams of urea
20 grams of sodium nitrite 1 kilo The material which has been printed with the printing colors (a) and (b) and dried is padded in a solution which contains per liter of water:

10 grams of oxalic acid
15 grams of formic acid of 85% strength and
25 grams of Glauber's salt, directly thereafter dried in a moderately heated cylinder drying machine, rinsed and soaped at the boil for 10 minutes. There are obtained fast, scarlet red prints besides green prints on a white ground.

(13) The following two printing colors are printed in different designs:

(a) 80 grams of the dyestuff preparation obtainable according to Example 5 of German patent No. 540,607 and consisting of the sodium salt of the nitrosamine from 2.5-dichloraniline, sodium hydroxide, sodium acetate and the sodium salt of 2.3-hydroxynaphthoylaminobenzene
360 grams of water
30 grams of caustic soda solution of 38° Bé.
30 grams of the sodium salt of sulfonated castor oil
500 grams of neutral starch tragacanth thickening 1 kilo (b) 80 grams of the sulfuric acid ester of the leuco compound of dimethoxydibenzanthrone
30 grams of ethylenethiodiglycol
60 grams of a mixture of ethyleneglycol, dioxyethyleneglycol and monomethylether
270 grams of water
500 grams of neutral starch tragacanth thickening
40 grams of urea
20 grams of sodium nitrite 1 kilo The material which has been printed with the printing colors (a) and (b) and which has been dried is padded with a solution of 10 grams of oxalic acid
15 grams of formic acid of 85% strength and
25 grams of Glauber's salt, made up to 1 liter dried directly thereafter on a moderately heated cylinder drying machine, rinsed and soaped at the boil for 10 minutes. There are obtained fast scarlet red and green prints in different patterns on a white ground.

(14)
(a) 80 grams of the dyestuff preparation consisting of a mixture of the diazo amino compound from 4.6-dichloro-2-amino-1-methylbenzene and 4-sulfo-1-aminobenzoic acid with the sodium salt of 2'.3' - hydroxynaphthoyl-4-methoxy-1-aminobenzene (cf. No. 18 of the table of British Patent No. 334,529)
100 grams of water
30 grams of caustic soda solution of 38° Bé.
30 grams of the sodium salt of sulfonated castor oil
450 grams of neutral starch tragacanth thickening
310 grams of water 1 kilo (b) 20 grams of the sulfuric acid ester of the leuco vat dyestuff from 5.7.5'.7'-tetrabromindigo 30 grams of ethylenethiodiglycol
450 grams of water
450 grams of neutral starch tragacanth thickening
25 grams of sodium chlorate
25 grams of vanadate of ammonium 1:100

1 kilo

The printing colors (a) and (b) are printed in different designs, the material is dried and padded on a two-roller-foulard between two rollers, (the lower roller covered with cloth dipping into the padding liquor) with a solution containing per liter 30 grams of acetic acid of 50% strength
30 grams of formic acid
60 grams of aluminium sulfate dried on heated cylinders or in heated chambers. Thereupon, it is rinsed and soaped at the boil.

There are obtained fast red prints besides fast light blue prints.

(15) The following printing colors are printed in different designs on white material:

(a) 80 grams of the mixture of the sodium salt of the nitrosamine from 5-chloro-2-methyl-1-aminobenzene with the sodium salt of 2'.3'-hydroxynaphthoyl-2-methyl-1-aminobenzene and anhydrous sodium acetate, obtainable according to German Patent No. 540,607
410 grams of water
30 grams of caustic soda solution of 38° Bé.
30 grams of the sodium salt of sulfonated castor oil
450 grams of neutral starch tragacanth thickening 1 kilo (b) 20 grams of the sulfuric acid ester of the leuco vat dyestuff from 5.7.5'.7'-tetrabromindigo
30 grams of ethylenethiodiglycol
450 grams of water
450 grams of neutral starch tragacanth thickening
25 grams of sodium chlorate
25 grams of vanadate of ammonium 1:100.

After having been printed, the material is padded on a two-roller-foulard between the two rollers (the lower roller covered with cloth dipping into the padding liquor) with a solution containing per liter of water 30 grams of acetic acid of 50% strength
30 grams of formic acid
60 grams of aluminium sulfate and thereupon dried on heated cylinders or in heated chambers, rinsed and soaped at the boil. There are obtained fast red prints besides fast light blue prints.

(D) Production of color resists under aniline black by means of a resist printing paste containing a mixture of a substantive azo component and a stabilized diazo compound as above disclosed, and another resist printing paste containing an ester salt of a leuco vat dyestuff, or a mixture of both such pastes.

The resist printing pastes, containing the dye preparations, the usual thickening and resist agents and other additions are printed on the material in separate designs or mixed with each other, the printed textile material is dried and thereupon padded with the aniline black preparation to which preparation the agents used in our new developing process have been added, namely, one or more organic acids, or phosphoric acid, or salts capable of splitting off acid, such as ammonium salts of organic acids, etc. The thus treated fibres are then subjected to a drying operation by means of heated cylinders or in heated chambers, whereby the azo dyestuffs are developed. Thereafter, the material is steamed in a suitable steamer, for instance in the Mather-Platt apparatus in order to develop the aniline black, and finally after treated in an aqueous solution containing a nitrite and an inorganic or organic acid and finished in the usual manner. The treatment with the nitrite and the dilute acid solution causes the development of the vat dyestuffs, and simultaneously the oxidation of the aniline black is completed. The following examples illustrate the said resist printing process:

(16) The following printing colors are printed in different designs on white cotton material:

(a)  80 grams of azo dyestuff preparation used according to example 14
100 grams of water
30 grams of alcohol
30 grams of caustic soda solution of 38° Bé.
450 grams of neutral starch tragacanth thickening
150 grams of zinc white 1:1
160 grams of water 1 kilo (b)  15 grams of the sulfuric acid ester of the leuco vat dyestuffs from 5.7.5'.7'-tetrabromindigo
30 grams of ethylenethiodiglycol
355 grams of water
450 grams of neutral starch tragacanth thickening
150 grams of zinc white 1:1

1 kilo

After the material has been printed and dried, it is padded on a two-roller-foulard with the printed surface downwards, (the lower roller covered with cloth dipping into the padding solution) with the following aniline-black padding solution and immediately thereafter dried on a cylinder drying machine.

Aniline-black padding liquor:
Solution I
90 grams of aniline salt
5 grams of aniline oil
200 cc. of water
50 grams of tragacanth 60:1000

Solution II
70 grams of potassium ferrocyanide
300 cc. of water

Solution III
35 grams of sodium chlorate
200 cc. of water
40 grams of acetic acid of 50% strength
10 grams of formic acid, made up to 1 liter The Solutions I, II and III are mixed before use. After the padded material has been dried on a cylinder drying machine, it is steamed for about 3 minutes in a Mather-Platt apparatus, thereupon treated for a short time at 60° C. with the following solution containing per liter 3 grams of sodium nitrite
5 grams of formic acid
10 grams of sulfuric acid rinsed and soaped at the boil.

There are obtained vivid scarlet red prints besides vivid light-blue prints on a black ground.

(17) The following printing colors are printed in different designs on white cotton fabric:

(a)  80 grams of the nitrosamine printing color used in Example 13
100 grams of water
30 grams of alcohol.
30 grams of caustic soda solution of 38° Bé.
450 grams of neutral starch tragacanth thickening
150 grams of zinc white 1:1
160 grams of water 1 kilo (b)  15 grams of the sulfuric acid ester of the leuco vat dyestuff from 5.7.5.'7'-tetrabromindigo
30 grams of ethylenethiodiglycol
355 grams of water
450 grams of neutral starch tragacanth thickening
150 grams of zinc white 1:1

1 kilo

After the material has been printed and dried on a two-roller-foulard with the printed surface downwards, (the lower roller covered with cloth dipping into the padding solution) it is padded with the following aniline-black padding solution and immediately thereafter dried on a cylinder drying machine.

Aniline-black padding solution:

Solution I
90 grams of aniline salt
5 grams of aniline oil
200 cc. of water
50 grams of tragacanth mucilage 60:1000

Solution II
70 grams of potassium ferrocyanide
300 cc. of water

Solution III 35 grams of sodium chlorate
200 cc. of water
40 grams of acetic acid of 50% strength
10 grams of formic acid, made up to 1 liter The Solutions I, II and III are mixed together before use. After having been dried on the cylinder drying machine, the padded material is steamed for about 3 minutes in a Mather-Platt apparatus and is after-treated for a short time at 60° C. with the following solution, in order to develop the vat dyestuff from the leuco ester salt, containing per liter 3 grams of sodium nitrite or sodium bichromate
5 grams of formic acid
10 grams of sulfuric acid Thereupon, the material is rinsed and soaped at boiling temperature. There are obtained vivid scarlet red prints besides vivid light-blue prints on a black ground.

(18) The following printing pastes are printed in different designs on white material:

(a) I 60 grams of a mixture of the diazoamino compound of 4-chloro-2-amino-1-methylbenzene and 4-sulfo-2-amino benzoic acid with diaceto-acetyl-ortho-tolidide (cf. No. 3 of the table of British Patent No. 334,529)
100 cc. of water
30 grams of alcohol
30 grams of caustic soda solution of 38° Bé.
200 grams of neutral starch tragacanth thickening
II 20 grams of the sulfuric acid ester of the leuco vat-dyestuff from dimethoxy-dihydrodibenzanthrone (cf. Schultz Farbstofftabellen, 7th ed., No. 1269)
30 grams of ethylenethiodiglycol
130 grams of water
250 grams of neutral starch tragacanth thickening
150 grams of zinc white 1:1

1 kilo

The printing pastes I and II are prepared separately, mixed together and 150 grams of zinc white 1:1 are added thereto.

(b) 80 grams of the dyestuff preparation consisting of a mixture of the diazo-amino compound from 4-chloro-2-amino-1-methoxybenzene and methyl-amino acetic acid with sodium salt of 2'.3'-hydroxynaphthoyl-2-methoxy-1-aminobenzene (cf. No. 20 of the table of British Patent No. 334,529)
100 grams of water
30 grams of alcohol
30 grams of caustic soda solution of 38° Bé.
450 grams of neutral starch tragacanth thickening
150 grams of zinc white 1:1
160 grams of water 1 kilo After printing and drying, the material is treated in the manner indicated in the Examples 16 and 17.

There are obtained vivid red prints besides vivid yellowish-green prints on a black ground.

(19) There are printed in different designs on white material:

(a) I 60 grams of the dyestuff preparation obtainable according to Example 1 of German Patent No. 524,266 and consisting of the sodium salt of the nitrosamine of 5-chloro-2-methoxy-1-aminobenzene, sodium hydroxide, sodium acetate and diacetoacetyl-ortho-tolidide.
100 cc. of water
30 grams of alcohol
30 grams of caustic soda solution of 38° Bé.
200 grams of neutral starch tragacanth thickening
II 20 grams of the sulfuric acid ester of the leuco compound of dimethoxydihydrodibenzanthrone (Schultz Farbstofftabellen, 7th ed. No. 1269)
30 grams of ethylenethiodiglycol
130 grams of water
250 grams of neutral starch tragacanth thickening
150 grams of zinc white 1:1

1 kilo

The printing pastes I and II are prepared separately, mixed together and 150 grams of zinc white 1:1 are added, while stirring.

(b) 80 grams of the dyestuff preparation obtainable according to Example 5 of German patent No. 540,607
100 grams of water
30 grams of alcohol
30 grams of caustic soda solution of 38° Bé.
450 grams of neutral starch tragacanth thickening
150 grams of zinc white 1:1
160 grams of water 1 kilo After the material has been printed and dried, it is treated with an aniline-black-padding solution and further treated as indicated in Example 5. There are obtained vivid red tints besides vivid yellowish-green tints on a black ground.

We claim:

1. In the production of insoluble azo dyestuffs on the fiber by means of mixtures comprising a substantive azo component and a stabilized diazo compound of the group consisting of water-soluble diazoamino compounds from aromatic diazo compounds and alkali metal salts of aromatic nitrosamines, the steps which comprise developing the dyestuffs by passing the goods, to which the said mixtures of dye components have been applied, into a bath containing an aqueous solution of at least one of the agents of the group consisting of organic acids, phosphoric acid, easily dissociating metal salts of inorganic acids, and salts which are capable of splitting off acid, thereupon subjecting the thus treated goods to a drying operation by passing them along a heated drying device.

2. The process which comprises printing the fiber with a printing paste comprising a substantive azo component and a stabilized diazo compound of the group consisting of water-soluble diazo-amino compounds from aromatic diazo compounds and alkali metal salts of aromatic nitrosamines, padding the printed material with a bath containing at least one of the agents of the group consisting of acetic acid, formic acid, glycolic acid, oxalic acid, phosphoric acid, sulfates and chlorides of zinc, aluminium and magnesium, and ammonium salts of organic acids capable of splitting off the acids, thereupon subjecting the thus treated goods to a drying operation by passing them along a heated drying device.

3. In the process of preparing color resists under aniline black by means of resist printing colors comprising a substantive azo component and a stabilized diazo compound of the group consisting of water-soluble diazoamino compounds from aromatic diazo compounds and alkali metal salts of aromatic nitrosamines, the steps which comprise printing the textile material with a resist printing paste comprising the said mixtures of dye components and the usual thickening and resist agents, padding the printed goods in an aniline black padding liquor to which at least one of the agents of the group consisting of organic acids, phosphoric acid, easily dissociating metal salts of inorganic acids, and salts which are capable of splitting off acid has been added, thereupon subjecting the thus printed and padded goods to a drying operation by passing them along a heated drying device or, whereby the azo dyestuffs are developed on the printed parts of the material, thereafter developing the aniline black ground by steaming the material, and finishing in the usual manner.

4. A process according to claim 3, wherein besides the resist printing paste containing the azo dye preparation another resist printing paste comprising an ester salt of a leuco vat dyestuff is printed on the fabric, and wherein after the steaming operation the goods are passed through an aqueous solution containing a nitrite and an acid, in order to develop the ester salts of the leuco vat dyestuffs to the corresponding vat dyestuffs.

5. The process of preparing color resists on dyeings prepared by means of ester salts of leuco vat dyestuffs which comprises padding the fabric with a padding liquor containing an ester salt of a leuco vat dyestuff, an oxidizing agent of the group consisting of nitrites and neutral chromates, printing the thus impregnated material with a resist printing paste comprising a substantive azo component and a stabilized diazo compound of the group consisting of water-soluble diazoamino compounds from aromatic diazo compounds and alkali metal salts of aromatic nitrosamines, the usual thickening agents and resist agents for preventing the development of the ester salts of the leuco vat dyestuffs on the printed parts, thereupon drying the fabric and padding it with an aqueous solution containing at least one of the agents of the group consisting of organic acids, phosphoric acid, easily dissociating metal salts of inorganic acids, and salts which are capable of splitting off acid and then subjecting the thus treated goods to a drying operation by means of a heated drying device.

6. A process according to claim 5, wherein as the oxidizing agent in the padding liquor containing the ester salt of a leuco vat dyestuff an alkali metal chlorate together with an agent accelerating the oxidation is used and wherein aluminium sulfate is present in that padding solution which is applied to the fabric before it is subjected to the drying operation.

7. The process which comprises printing a fabric with a resist printing paste comprising a substantive azo component and a stabilized diazo component of the group consisting of water-soluble diazoamino compounds from aromatic diazo compounds and alkali metal salts of aromatic nitrosamines, the usual thickening agents and resist agents for preventing the development of ester salts of leuco vat dyestuffs to the corresponding vat dyestuffs, drying the printed fabric, padding it with a solution containing an ester salt of a leuco vat dyestuff, an alkali metal chlorate as an oxidizing agent, ammonium vanadate as an agent for accelerating the oxidation, an agent capable of yielding acid and an ammonium salt of a feeble organic acid, thereupon subjecting the fabric to a drying operation by means of heated cylinders, whereby the azo dye preparations are transformed into the insoluble azo dyestuffs on the printed parts, and then steaming the material in order to develop the ester salts to the corresponding vat dyestuffs.

RICHARD FISCHER.
HERMANN FREUND.